United States Patent [19]
Chang

[11] Patent Number: 5,291,764
[45] Date of Patent: Mar. 8, 1994

[54] DEVICE FOR PREVENTION OF ACCIDENTAL RELEASE OF HAND BRAKE OF MOTOR VEHICLE

[76] Inventor: Wen-Kuei Chang, No. 30, Lane 208, Ho-Hsing Rd., Hsiang-Yang Village, Chang-Chih Hsiang, Pingtung Hsien, Taiwan

[21] Appl. No.: 34,765

[22] Filed: Mar. 19, 1993

[51] Int. Cl.[5] .......................................... G05G 5/00
[52] U.S. Cl. ....................................... 70/202; 70/181; 70/237; 188/265
[58] Field of Search ................ 70/238, 181, 192, 201, 70/202, 237, 215, 245, 247; 74/473 R, 473 SW, 475, 523, 534; 188/265

[56] References Cited
U.S. PATENT DOCUMENTS

| 4,726,207 | 2/1988 | Gifford | 70/237 X |
| 4,858,451 | 8/1989 | Balina et al. | 70/202 |
| 5,134,764 | 8/1992 | Taylor | 70/237 X |

FOREIGN PATENT DOCUMENTS

| 2343210 | 1/1975 | Fed. Rep. of Germany | 70/201 |
| 31954 | 8/1927 | France | 70/181 |
| 815645 | 7/1937 | France | 70/201 |
| 576024 | 4/1958 | Italy | 70/181 |
| 628058 | 8/1949 | United Kingdom | 70/181 |
| 1088853 | 10/1967 | United Kingdom | 70/181 |

Primary Examiner—Peter M. Cuomo
Assistant Examiner—Suzanne L. Dino
Attorney, Agent, or Firm—Larson and Taylor

[57] ABSTRACT

A key-controlled device is fastened to a hand brake lever of a motor vehicle for preventing the activated hand brake lever from being released accidentally. The device has a locking apparatus provided with a shaft capable of being activated by a key which is inserted into the locking apparatus. The activated shaft presses against the press button of the activated hand brake lever, which is then released. The release of the activated hand brake lever can not be done without the key.

1 Claim, 5 Drawing Sheets

DEVICE FOR PREVENTION OF ACCIDENTAL RELEASE OF HAND BRAKE OF MOTOR VEHICLE

FIELD OF THE INVENTION

The present invention relates to a hand brake (parking brake) of a motor vehicle, and more particularly to a device capable of preventing the hand brake of a motor vehicle from being released accidentally.

BACKGROUND OF THE INVENTION

In general, a motor vehicle, such as a sedan, is equipped with a hand brake (parking brake) for use in causing the motor vehicle to remain stationary in a place where the motor vehicle is parked. It happens at times that a car driver has to park the car in a place and to leave for a moment to take care of the chores, leaving behind an accompanying child or children in the car. In the absence of an adult's supervision, the accompanying child or children may release the hand brake of the car accidentally or playfully. Such an incident can often bring about a serious accident, especially when the car in question is parked in a sloped place. Nowadays the car makers are required by law to equip the cars with a safety device capable of preventing the hand brake of a motor vehicle from being released accidentally by a child.

SUMMARY OF THE INVENTION

It is, therefore, the primary objective of the present invention to provide a hand brake of a motor vehicle with a device capable of preventing the hand brake from being released accidentally or playfully by a child.

In keeping with the principles of the present invention, the foregoing objective of the present invention is accomplished by a device which is controlled by a key of the motor vehicle and is disposed in the press button of the hand brake of the motor vehicle. In other words, the press button of the hand brake of the motor vehicle can not be pressed to release the hand brake without a correct ignition key which must be inserted properly into the press button of the hand brake.

The foregoing objective and features of the present invention can be more readily understood upon a thoughtful deliberation of the following detailed description of the present invention in conjunction with the accompanying drawings.

DETAILED DESCRIPTION OF THE INVENTION

Figure 1:
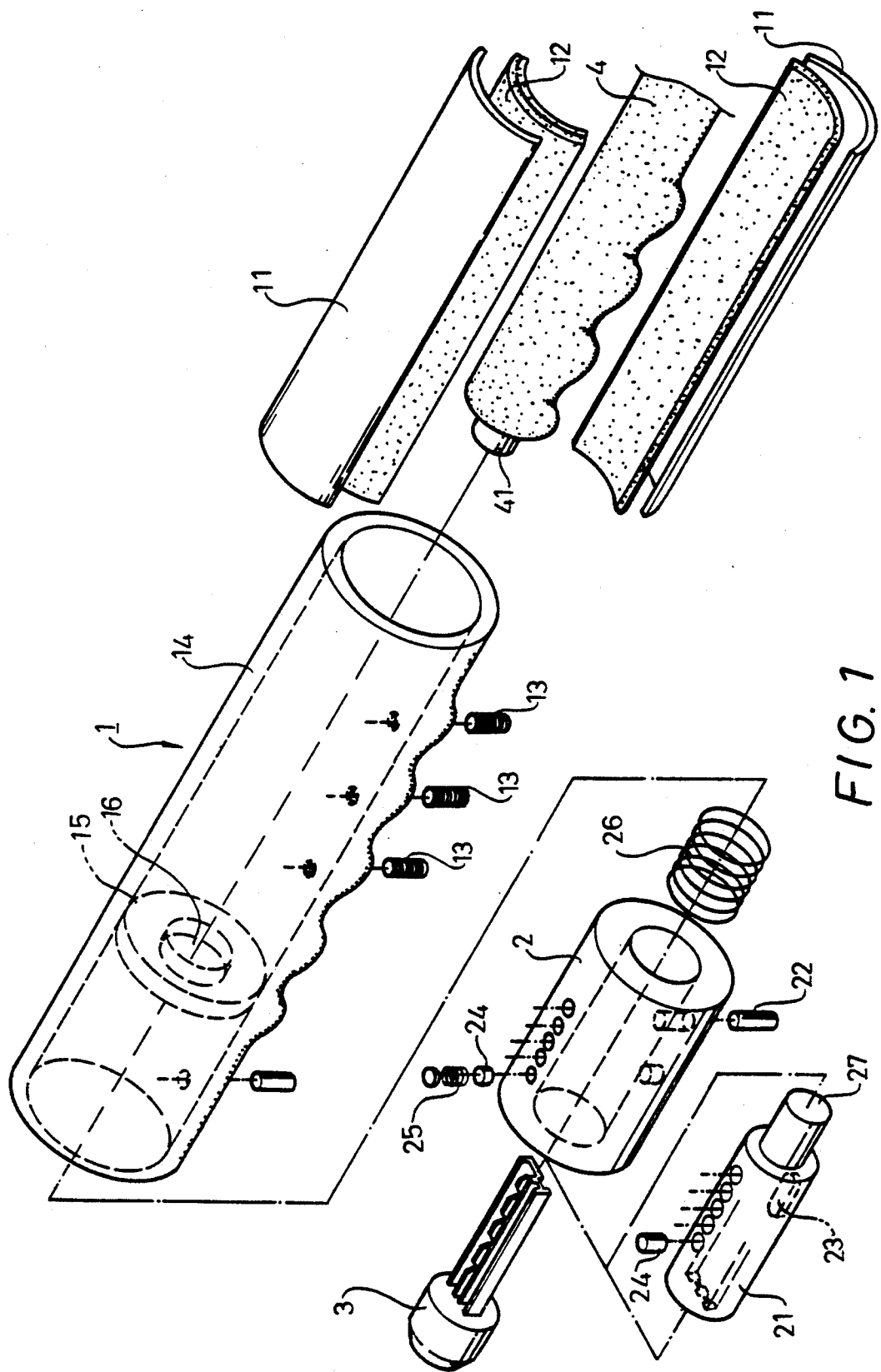
FIG. 1 shows an exploded view of a first preferred embodiment of the present invention.
Figure 2:
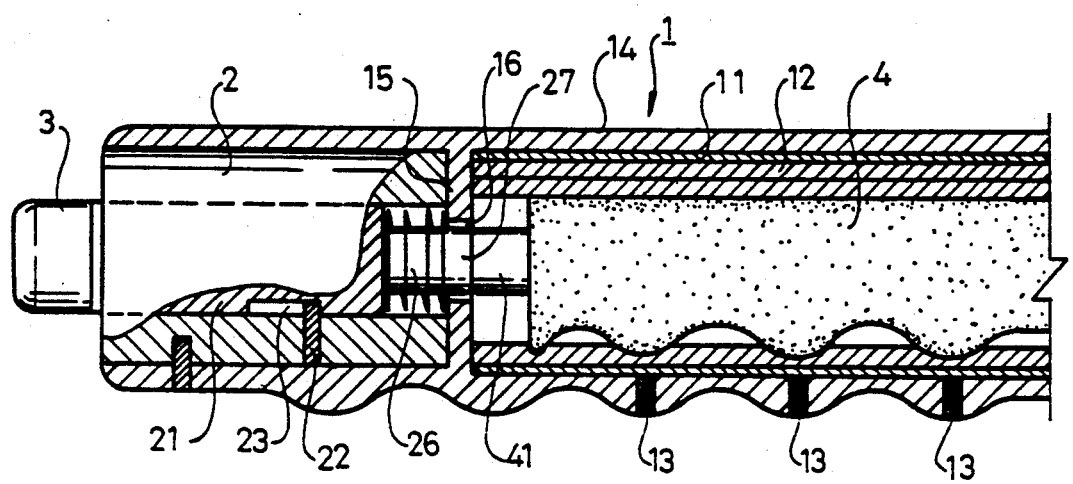
FIG. 2 shows a sectional view of the first preferred embodiment in combination, according to the present invention.
Figure 3:
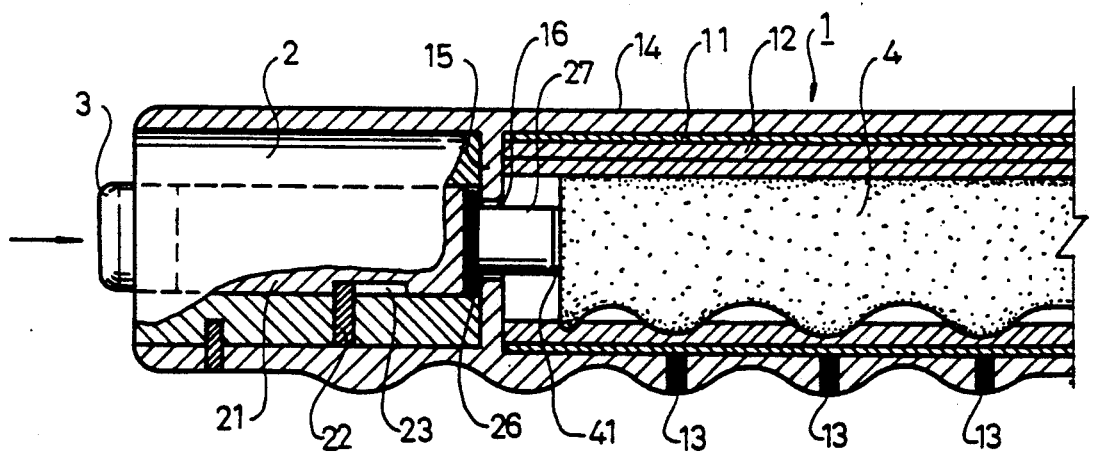
FIG. 3 shows a schematic view of the first, preferred embodiment at work, according to the present invention as shown in FIG. 2.

Referring to FIGS. 1-3, a first preferred embodiment of the present invention is shown to comprise a key-controlled device 1, which is fastened securely in place in a hand brake lever 4 and is composed of a locking apparatus 2. In order to release the hand brake lever 4 at work, one must insert a key 3 onto the locking apparatus 2 to reach and press the press button 41 of the hand brake lever 4.

As shown in FIG. 1, the key-controlled device 1 has a housing 14 provided therein with a cushion piece 11 and a soft cushion 12. The housing 14 of the key-controlled device 1 is fastened securely to the hand brake lever 4 by means of bolts 13 or other fastening means. The housing 14 is provided therein with an inner wall plate 15 having one end that is fastened with the hand brake lever 4 and having another end that is fastened with the locking apparatus 2. The inner wall plate 15 has a hole 16 so dimensioned as to permit a shaft 27 of the locking apparatus 2 to pass therethrough to press against the press button 41 of the hand brake lever 4.

The locking apparatus 2 comprises mainly a lock core 21 and an elastic element 26. The lock core 21 is disposed in the locking apparatus 2 such that the lock core 21 can be caused to move in a limited manner along the direction of the longitudinal axis of the locking apparatus 2. Such a limited movement of the lock core 21 is attained by means of a pin 22 engageable with a groove 23 of the lock core 21. When the locking apparatus 2 is activated by the key 3, the shaft 27 of the locking apparatus 2 is so pushed as to pass through the hole 16 of the inner wall plate 15 of the housing 14 to press against the press button 41 of the hand brake lever 4. With a view to facilitating a correct entry of the key 3 into the locking apparatus 2, a plurality of pin balls 24 and the elastic element 26 are provided to facilitate the movements of the lock core 21 inside the locking apparatus 2. When the pin balls 24 are caused to move by the key 3 which is inserted into the locking apparatus 2, the lock core 21 is pushed to move accordingly. As soon as the lock core 21 is relieved of the external force exerting thereon, the lock core 21 is forced to return to its original position by the elastic force of the elastic element 26, As illustrated in FIG. 2, the key 3 is inserted into the lock core 21 of the locking apparatus 2 by a driver. When the inserted key 3 is pushed further into the lock core 21, as shown in FIG. 3, the lock core 21 is caused to move deeper into the locking apparatus 2 in a straight line manner, so as to cause the shaft 27 to press against the press button 41 of the hand brake lever 4. It must be noted here that the extent of such straight line movement of the lock core 21 is limited by the length of of the groove 23. It is therefore apparent that the activated hand brake lever 4 can not be released accidentally without the key 3. It is suggested that the driver takes the key 3 with him or her when leaving the parked car temporarily, so as to ensure that the hand brake lever 4 of the parked car is not released accidentally or intentionally by any unauthorized person.

Figure 4:
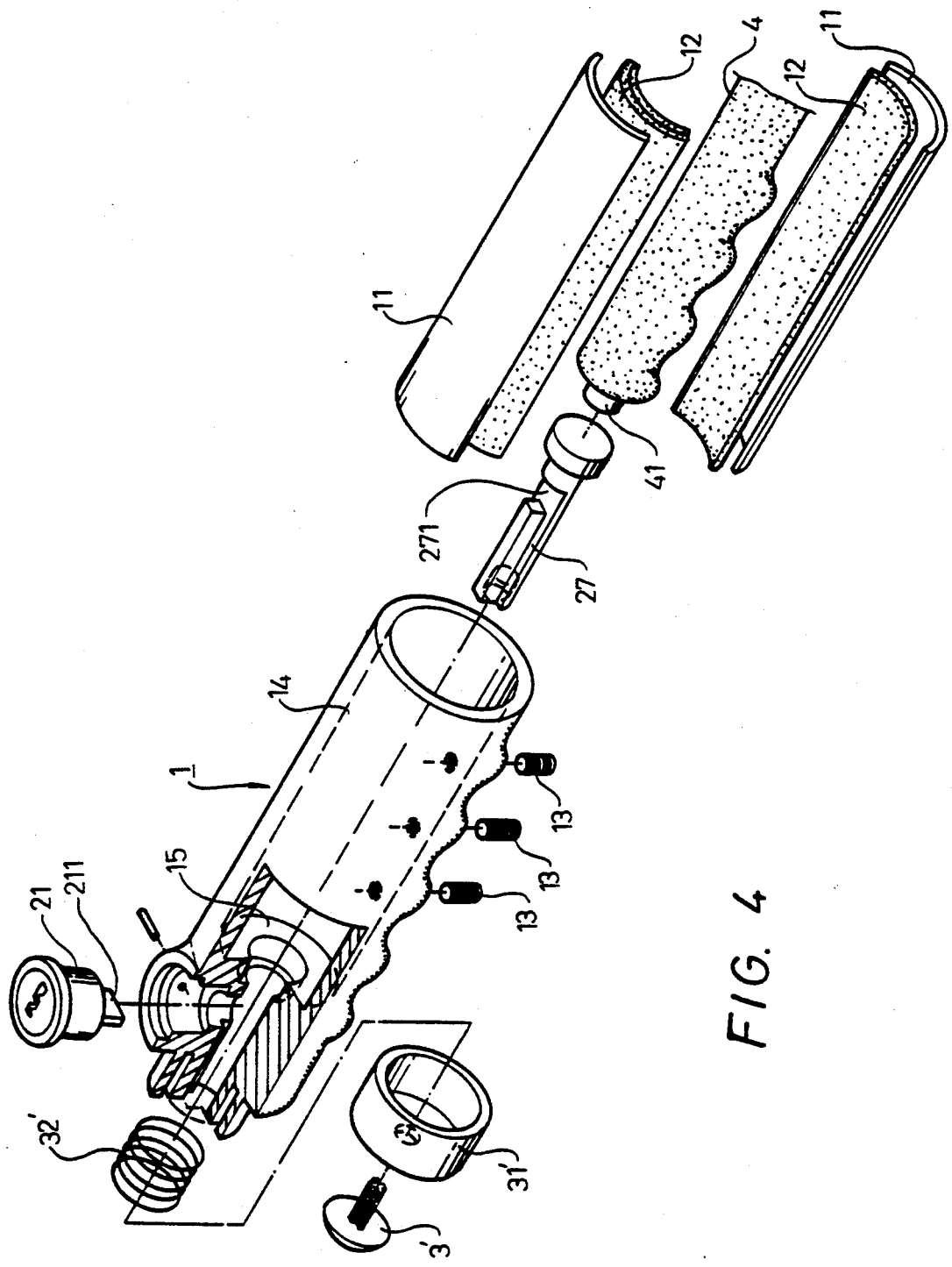
FIG. 4 shows an exploded view of a second preferred embodiment of the present invention.
Figure 5:
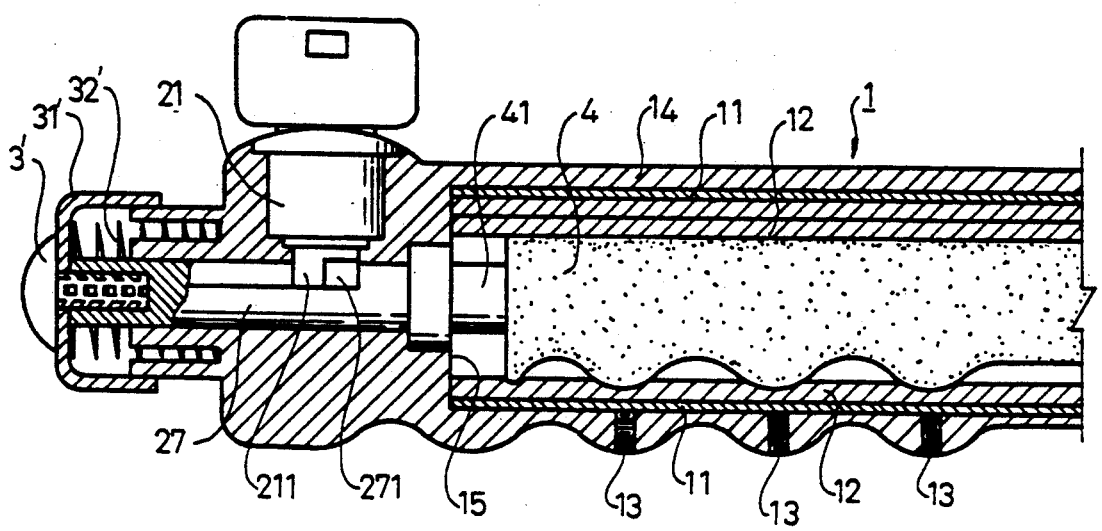
FIG. 5 shows a sectional view of the second preferred embodiment in combination, according to the present invention.
Figure 6:
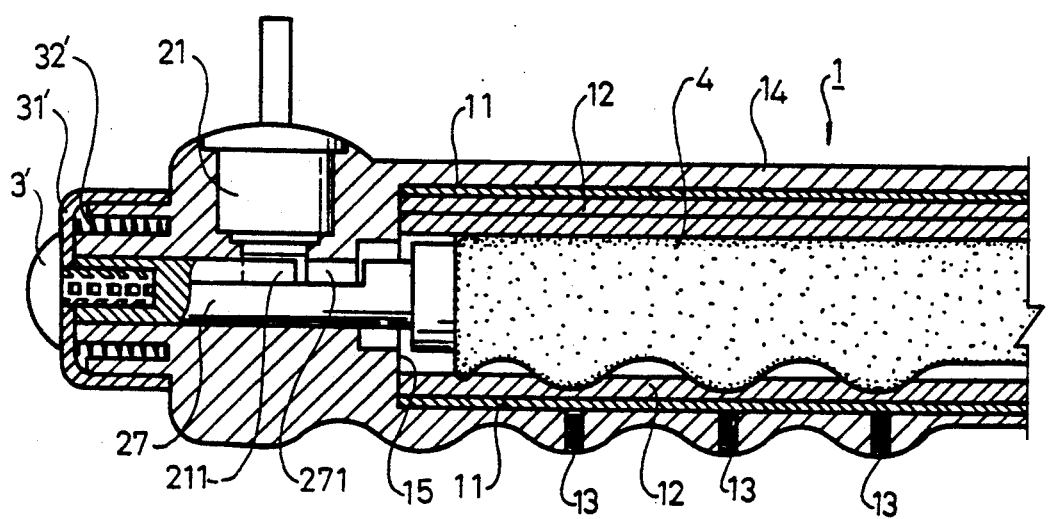
FIG. 6 shows a schematic view of the second preferred embodiment in action, according to the present invention as shown in FIG. 5.

A second preferred embodiment of the present invention is illustrated in FIGS. 4-6, in which the key-controlled device 1 is shown to comprise a housing 14 provided therein with a cushion piece 11 and a soft cushion 12. A hand brake lever 4 is fastened securely to the housing 14 by means of a plurality of bolts 13 or other fastening means. The housing 14 is further provided therein with an inner wall plate 15 having a hole so dimensioned as to permit a shaft 27 to pass therethrough. The key-controlled device 1 further comprises a hole to accommodate therein a lock core 21 having a control key 211. The shaft 27 is provided with a restraining slot 271 and has one end opposite to a press button 41 of a hand brake lever 4 and another end fastened to a press cap 3'. In addition, the shaft 27 is fitted into a sleeve 31' and an elastic element 32'. The sleeve 31' is capable of causing the shaft 27 to move back to its original position by the elastic force of the elastic element 32'.

As shown in FIG. 5, the control key 211 of the lock core 21 is retained in the restraining slot 271 of the shaft at such time when the lock core 21 is not rotated by the key. As a result, the press cap 3' can not be pressed to release the hand brake lever 4. Now referring to FIG. 6, the lock core 21 is shown to be rotated by the key, thereby causing the control key 211 of the lock core 21 to move out of the restraining slot 271 of the shaft 27. As a result, the shaft 27 can be pushed by the press cap 3' to press against the press button 41 of the hand brake lever 4, which is then released.

Figure 7:
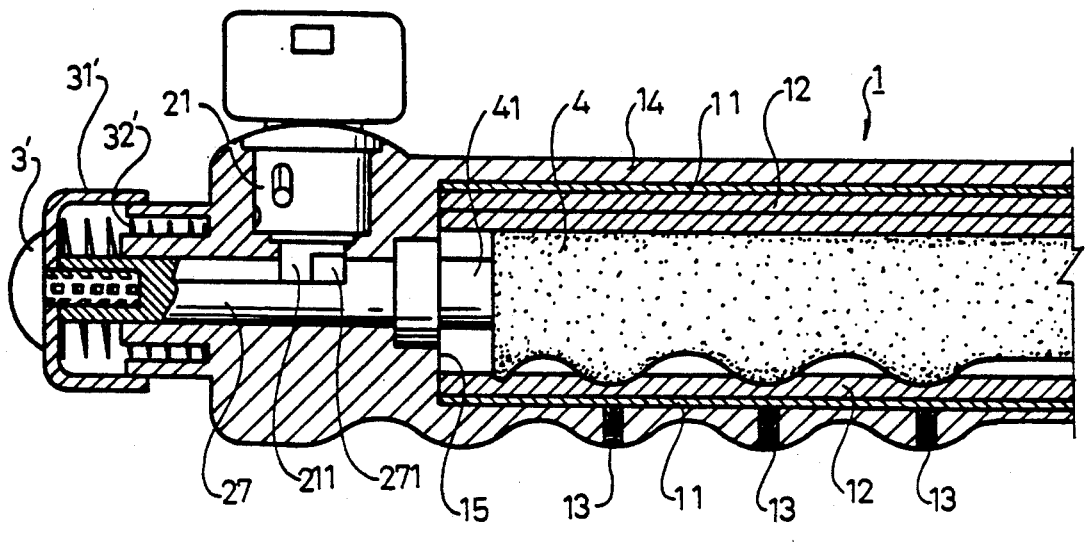
FIG. 7 shows a sectional view of a third preferred embodiment of the present invention in combination.
Figure 8:
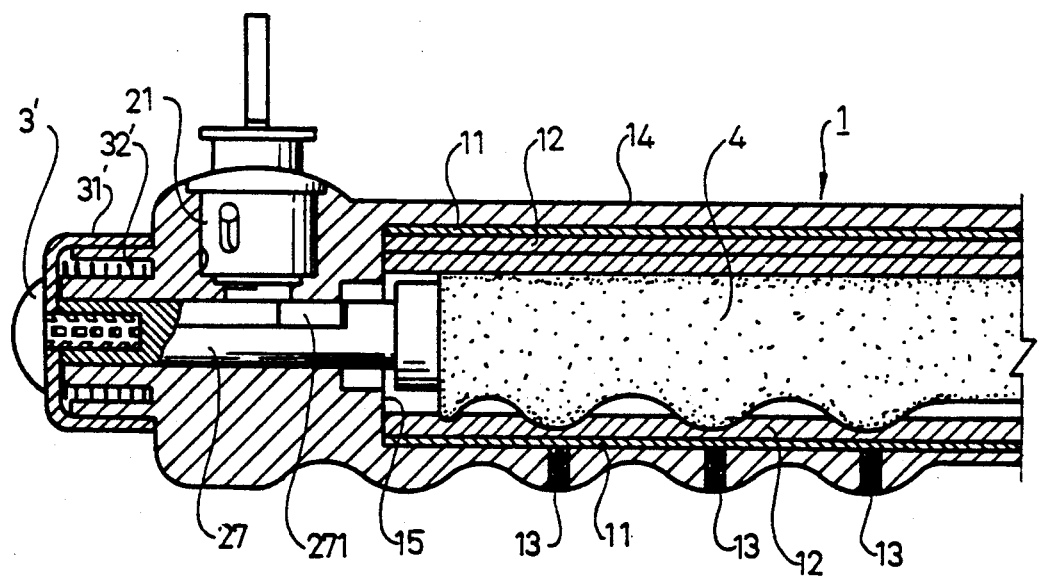
FIG. 8 shows a schematic view of the third preferred embodiment in action, according to the present invention as shown in FIG. 7.

A third embodiment of the present invention is illustrated in FIGS. 7 and 8. The third embodiment is similar to the first preferred embodiment of the present invention in that the former has a locking apparatus 2 capable of making a straight line movement so as to cause the end portion of the lock core 21 to be retained in the restraining slot 271 of the shaft 27 or to move out of the restraining slot 271 of the shaft 27. The hand brake lever 4 can be released only when the press button 41 of the hand brake lever 4 is pressed by the shaft 27.

The embodiments of the present invention described above are to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A device for preventing an accidental pressing in of a press button of a hand brake of a motor vehicle comprising:
   a key; and
   a key controlled device including
   a housing fastened securely to the hand brake,
   a lock core mounted in said housing and capable of being rotated when said key is received therein from a first position to a second position, said lock cure including a control key which is rotated therewith, and
   a shaft mounted in said housing for manual movement from a position adjacent the press button of the hand brake to a position where the press button is pressed in and the hand brake is released, said shaft including a restraining slot (a) in which said control key is received when said lock core is in the first position to prevent said shaft from moving and pressing in the press button and (b) in which said control key is not received when said lock core is in the second position so that said shaft is manually movable to press in the press button.

* * * * *